(12) United States Patent
Zhang et al.

(10) Patent No.: US 11,966,009 B2
(45) Date of Patent: Apr. 23, 2024

(54) DISPLAY SUBSTRATE AND METHOD FOR PREPARING THE SAME, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Xiaoxiang Zhang, Beijing (CN); Hao Han, Beijing (CN); Yihe Jia, Beijing (CN); Lianjie Yang, Beijing (CN); Xiangqian Ding, Beijing (CN); Yongzhi Song, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 812 days.

(21) Appl. No.: 16/959,993

(22) PCT Filed: Sep. 11, 2019

(86) PCT No.: PCT/CN2019/105297
§ 371 (c)(1),
(2) Date: Jul. 2, 2020

(87) PCT Pub. No.: WO2021/046742
PCT Pub. Date: Mar. 18, 2021

(65) Prior Publication Data
US 2021/0405262 A1    Dec. 30, 2021

(51) Int. Cl.
*G02B 1/113*    (2015.01)
*G02F 1/1362*    (2006.01)

(52) U.S. Cl.
CPC .......... *G02B 1/113* (2013.01); *G02F 1/13629* (2021.01); *G02F 1/136295* (2021.01); *G02B 2207/101* (2013.01); *G02F 2201/38* (2013.01)

(58) Field of Classification Search
CPC .......... G02F 1/13629; G02F 1/136295; G02F 2201/38; G02F 1/113; G02F 1/136286
See application file for complete search history.

(56) References Cited

U.S. PATENT DOCUMENTS

2004/0263706 A1* 12/2004 Cho .................. G02F 1/136286
                                                          349/43
2014/0204315 A1*  7/2014 Park ................. G02F 1/136286
                                                          349/65
(Continued)

FOREIGN PATENT DOCUMENTS

CN      105093654 A    11/2015
CN      107371363 A    11/2017
(Continued)

OTHER PUBLICATIONS

Sebastien Maeder, NACK Network, "Physical and Chemical Vapor Deposition", 2018, nanohub, slides 4-5, 20, and 38-39, https://nanohub.org/resources/28432/about (Year: 2018).*

(Continued)

*Primary Examiner* — Alexander P Gross
(74) *Attorney, Agent, or Firm* — McCoy Russell LLP

(57) ABSTRACT

The present disclosure provides a display substrate, a method for preparing the same, and a flexible display device, and belongs to the technical field of display. Among them, the display substrate includes: a base substrate; a metal pattern located on the base substrate, and an anti-reflection pattern located on a surface of the metal pattern proximate to the base substrate; in which a material of the anti-reflection pattern includes molybdenum oxide doped with a refractory metal, and a melting point of the refractory metal (Continued)

is greater than a temperature threshold. The technical solution of the present disclosure is capable of reducing the reflection of ambient light by the display substrate.

13 Claims, 1 Drawing Sheet

(56) References Cited

U.S. PATENT DOCUMENTS

| | | | |
|---|---|---|---|
| 2016/0133198 A1* | 5/2016 | Jeong | G09G 3/36 345/212 |
| 2017/0235196 A1 | 8/2017 | Lai et al. | |
| 2017/0248827 A1 | 8/2017 | Zhang | |
| 2018/0018043 A1 | 1/2018 | Yoon et al. | |
| 2018/0033893 A1 | 2/2018 | Lee et al. | |
| 2018/0069128 A1 | 3/2018 | Shin et al. | |
| 2020/0026134 A1* | 1/2020 | Lee | H01L 27/124 |
| 2020/0135933 A1* | 4/2020 | Misaki | H01L 21/441 |

FOREIGN PATENT DOCUMENTS

| | | |
|---|---|---|
| CN | 107407846 A | 11/2017 |
| CN | 107799566 A | 3/2018 |

OTHER PUBLICATIONS

Hyeong-U Kim et al., "Highly uniform wafer-scale synthesis of MoO3 by plasma enhanced chemical vapor deposition", 2017, IOP Publishing, nanotechnology 28, pp. 1-6, https://swb.skku.edu/_res/pnpl/etc/2017-13.pdf (Year: 2017).*

* cited by examiner

DISPLAY SUBSTRATE AND METHOD FOR PREPARING THE SAME, AND DISPLAY DEVICE

CROSS-REFERENCE TO RELATED APPLICATIONS

The present application is a U.S. National Phase of International Patent Application Serial No. PCT/CN2019/105297 entitled "DISPLAY SUBSTRATE AND METHOD FOR PREPARING THE SAME, AND DISPLAY DEVICE," filed on Sep. 11, 2019. The entire contents of the above-referenced application is hereby incorporated by reference for all purposes.

TECHNICAL FIELD

The present disclosure relates to the field of display technology, in particular to a display substrate, a method for preparing the same, and a display device.

BACKGROUND

In the related art of display substrate, an anti-reflection pattern is added on the light emitting side of the metal pattern, to reduce the reflection of the ambient light by the display substrate.

SUMMARY

The embodiment of the present disclosure provides a display substrate, a method for preparing the same, and a display device.

An embodiment of the present disclosure provides a technical solution as follows.

In one aspect, a display substrate is provided, including: a base substrate; a metal pattern located on the base substrate; and an anti-reflection pattern located on a surface of the metal pattern proximate to the base substrate, in which a material of the anti-reflection pattern includes molybdenum oxide doped with a refractory metal, and a melting point of the refractory metal is greater than a temperature threshold.

Optionally, the temperature threshold is 2000° C.

Optionally, the molybdenum oxide includes molybdenum dioxide and/or molybdenum trioxide, and the refractory metal includes at least one of tantalum, niobium, titanium, and tungsten.

Optionally, in the anti-reflection pattern, a molar ratio of the refractory metal to molybdenum is in a range of 2:100 to 10:100.

Optionally, the thickness of the anti-reflection pattern is in a range of 30 nm to 75 nm, and the thickness of the metal pattern is in a range of 5 nm to 500 nm.

Optionally, a ratio of the thickness of the anti-reflection pattern to the thickness of the metal pattern is in a range of 0.140 to 0.160.

Optionally, when a ratio of the thickness of the anti-reflection pattern to the thickness of the metal pattern is less than 0.115, light reflected by the display substrate corresponding to a peak value obtained from measurement includes light with a wavelength greater than 600 nm.

Optionally, when a ratio of the thickness of the anti-reflection pattern to the thickness of the metal pattern is less than 0.170, light reflected by the display substrate corresponding to a peak value obtained from measurement includes light with a wavelength less than 500 nm.

Optionally, the thickness of the anti-reflection pattern is in a range of 50 nm to 55 nm, and the thickness of the metal pattern is 350 nm.

Optionally, the thickness of the anti-reflection pattern is in a range of 50 nm to 55 nm, and a reflectivity of the display substrate is less than 10%.

Optionally, the display substrate is an array substrate, and the metal pattern is a gate metal layer pattern.

Optionally, a material of the metal pattern is copper, the array substrate further includes a source-drain metal layer pattern, and a material of the source-drain metal layer pattern is a stacked structure of molybdenum/aluminum/molybdenum structure or copper.

Optionally, the refractory metal includes tantalum, the thickness of the anti-reflection pattern is 54 nm, a thickness of the gate metal pattern is 350 nm, the source-drain metal layer pattern is a stacked structure of molybdenum/aluminum/molybdenum, and thicknesses of molybdenum, aluminum and molybdenum layers are 15 nm, 300 nm, and 80 nm, respectively.

Optionally, the refractory metal includes tantalum, the thickness of the anti-reflection pattern is 54 nm, a thickness of the gate metal pattern is 350 nm, a material of the source-drain metal layer pattern is copper, and a thickness of the source-drain metal layer pattern is 350 nm.

Optionally, the display substrate is an array substrate, the metal pattern includes a source-drain metal layer pattern and a gate metal layer pattern, a material of the metal pattern is copper, and the refractory metal includes tantalum.

Optionally, the thickness of the metal pattern is 350 nm, and the thickness of the anti-reflection pattern is 54 nm.

An embodiment of the present disclosure further provides a display device, including the display substrate as described above, a color filter substrate arranged oppositely to form a cell with the display substrate, and a backlight source, in which the display substrate is located on a surface of the color filter substrate away from the backlight source.

REFERENCE NUMBERS

4 first light; 5 second light; 11 base substrate; 12 anti-reflection pattern; 13 metal pattern; 14 gate insulating layer; 15 active layer; 16 source-drain metal layer pattern; 17 passivation layer; 18 pixel electrode; 19 gate metal layer pattern.

DETAILED DESCRIPTION

In order to make the technical problems to be solved, the technical solutions, and the advantages of the examples of the present disclosure, the present disclosure will be described hereinafter in conjunction with the drawings and specific examples.

The signal lines and electrodes of the display substrate are mostly made of metal. When the display substrate is turned off or the black screen is displayed, ambient light is incident on the metal layer after being incident through the base substrate and reflected by the metal layer, so that the display substrate will still emit light in the black state.

Figure 1:
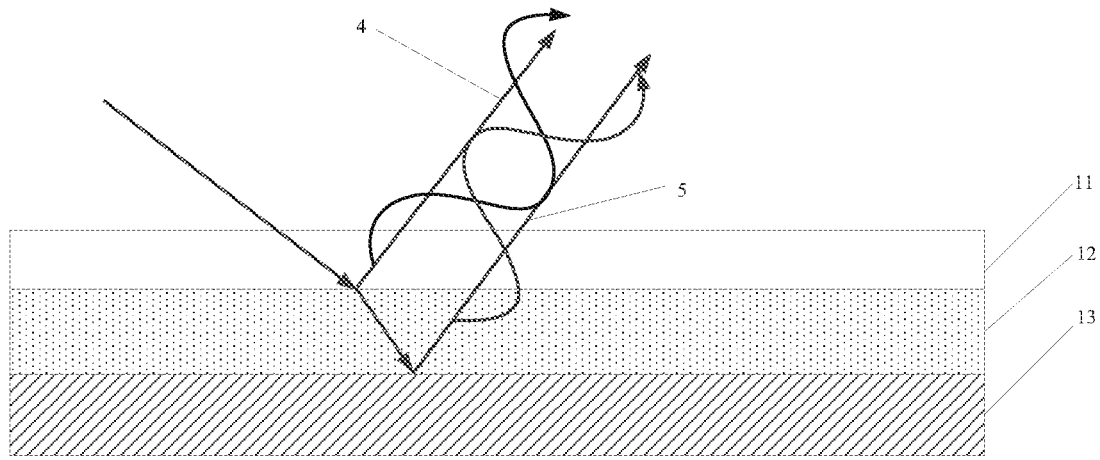
FIG. 1 is a schematic view showing the forming an anti-reflection layer on a metal layer.

In order to reduce the reflection of the display substrate to ambient light, this embodiment provides a display substrate. As shown in FIG. 1, the display substrate includes a base substrate 11, a metal pattern 13 located on the base substrate 11, and an anti-reflection pattern 12 located on a surface of the metal pattern 13 proximate to the base substrate 11, in which the anti-reflection pattern 12 is close to the metal pattern 13, and the material of the anti-reflection pattern 12 includes molybdenum oxide doped with a refractory metal. As shown in FIG. 1, after the ambient light is incident to the surfaces of the metal pattern 13 and the anti-reflection pattern 12, the second light 5 and the first light 4 reflected by the two surfaces have the same phase, their light waves encounter in the space to allow a destructive interference therebetween, thereby greatly reducing the reflectivity to ambient light of metal pattern 13.

In addition, as compared with the direct formation of the metal pattern 13 on the base substrate 11, the attachment of the metal pattern 13 to the base substrate 11 by molybdenum oxide can not only enhance the adhesion of the metal pattern 13 to the base substrate, but also prevent the metal ions in the metal pattern 13 from diffusing into the base substrate 11, thereby further improving the performance of the display substrate.

In this embodiment, the anti-reflection pattern 12 is made of molybdenum oxide doped with a refractory metal, in which the refractory metal is a metal having a melting point greater than a temperature threshold, specifically, the temperature threshold may be 2000° C. The refractory metal includes, but is not limited to, metals, such as tantalum Ta, niobium Nb, titanium Ti, and tungsten W.

Doping refractory metals in molybdenum oxide can further reduce the reflection of the metal pattern to ambient light. By doping different refractory metals in molybdenum oxide, different overall display colors can be achieved in the shutdown screen to meet the user's diverse needs. In the anti-reflection pattern 12, the molar ratio of the refractory metal to molybdenum is in a range from 2:100 to 10:100. By adjusting the molar ratio of refractory metal to molybdenum, the reflectivity of the display substrate to ambient light can be adjusted; and the display substrate can also display different colors in the shutdown screen.

Specifically, molybdenum oxide includes molybdenum dioxide and/or molybdenum trioxide. Molybdenum dioxide and molybdenum trioxide have high electrical conductivity. The anti-reflection pattern made of molybdenum dioxide and/or molybdenum trioxide has conductivity, is in parallel with the metal pattern, and can also reduce the resistance of the metal pattern, thereby further improving the performance of the display substrate.

Since copper has good conductivity, the metal pattern 13 can be made of copper. Of course, the material of the metal pattern 13 is not limited to copper, and other metals or alloys having good conductivity can also be used. For example, the metal pattern 13 can also be made of an alloy of MoNb and Cu, or an alloy of Al, Mo and Al. The metal pattern 13 may also be made from a stacked structure of Mo/Al/Mo. When the display substrate is an array substrate, the metal pattern 13 can be the gate metal layer pattern of the array substrate, or be the source-drain metal layer pattern of the array substrate.

Among them, the thickness of the anti-reflection pattern 12 is set such that the optical path difference between the lights reflected by the upper and lower surfaces of the anti-reflection pattern 12 is an odd multiple of the half wavelength of the reflected light, and the thickness of the anti-reflection pattern 12 satisfies:

$$2*n*h=(2k-1)*(\lambda/2); \quad (1)$$

in which n is a refractive index of the anti-reflection pattern 12, n may be 2.2 to 2.3, h is the film thickness of the anti-reflection pattern 12, k is a positive integer, and λ is a wavelength of incident light.

In this way, after the ambient light is incident on the surfaces of the metal pattern 13 and the anti-reflection pattern 12, the lights reflected by the upper and lower surfaces of the anti-reflection pattern 12 will interfere and cancel with each other, thereby achieving anti-reflection. Specifically, the thickness of the anti-reflection pattern 12 can be adjusted according to the wavelength of the incident light, as long as the optical path difference of light reflected by the upper and lower surfaces of the anti-reflection pattern 12 is an odd multiple of the half wavelength of the reflected light. In addition, the wavelength is mostly around 550 nm, and most of the light is incident in a direction perpendicular to the anti-reflection pattern 12, so that λ in the above formula (1) can be 550 nm. When λ is equal to 550 nm and k=1, the display substrate can reduce the reflectance of light with a wavelength of 450 nm to 600 nm to being 10% or less, thereby greatly reducing the reflection of the display substrate on the ambient light.

Specifically, the thickness of the anti-reflection pattern 12 may be in a range from 30 nm to 75 nm, and the thickness of the metal pattern 13 may be in a range from 5 to 500 nm, and the thickness and composition of the anti-reflection pattern 12 determine the color and reflection of the display substrate in the shutdown screen.

Specifically, a ratio of the thickness of the anti-reflection pattern 12 to the thickness of the metal pattern 13 may be in a range from 0.140 to 0.160. When this ratio in this range is used, the reflectivity of the display substrate in the shutdown screen can be made smaller.

Specifically, when a ratio of the thickness of the anti-reflection pattern 12 to the thickness of the metal pattern 13 may be less than 0.115, light reflected by the display substrate corresponding to the peak value obtained from measurement includes light with a wavelength greater than 600 nm, which allows a smaller reflectivity of the display substrate in the shutdown screen, and enables that the overall display color of the substrate including only the anti-reflection pattern and the metal pattern 13 is red.

Specifically, when a ratio of the thickness of the anti-reflection pattern to the thickness of the metal pattern is less than 0.170, light reflected by the display substrate corresponding to the peak value obtained from measurement includes light with a wavelength greater than 500 nm, which allows a smaller reflectivity of the display substrate in the shutdown screen, and enables that the overall display color of the substrate including only the anti-reflection pattern and the metal pattern 13 is blackish cyan.

The thickness of the anti-reflection pattern 12 may be in a range from 50 nm to 55 nm, and the thickness of the metal pattern 13 may be 350 nm, so that the reflectivity of the display substrate in the shutdown screen is relatively small.

The metal pattern in this embodiment may be a metal pattern arranged on the light emitting side of the display substrate, in which the metal pattern located on the light emitting side means that the metal pattern is closest to the light emitting side as compared to other film layers of the display substrate. The reflection of the display substrate to the ambient light mainly depends on the reflectivity of the metal pattern on the light emitting side to the ambient light. In this embodiment, the anti-reflection pattern is arranged between the metal pattern and the base substrate, thereby being capable of reducing the reflectivity to the ambient light of the metal pattern on the light emitting side, and further reducing the reflectivity to ambient light of the display substrate. Specifically, the metal pattern in this embodiment may be a gate metal layer pattern of the display substrate, or may be a source-drain metal layer pattern of the display substrate.

Figure 2:
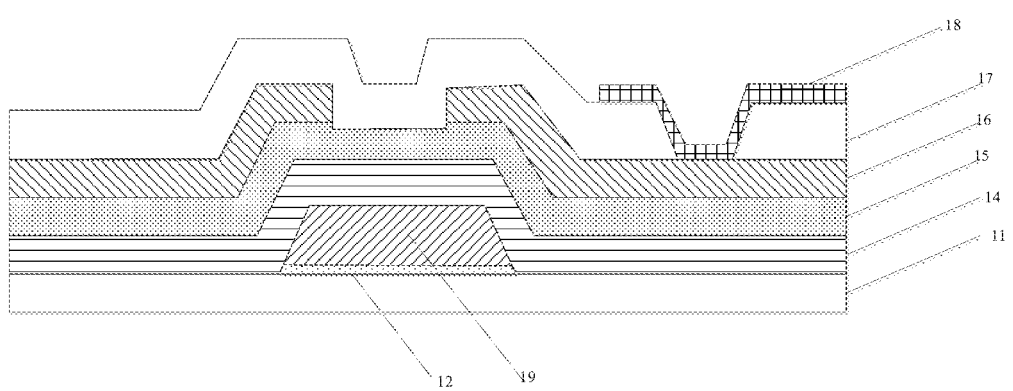
FIG. 2 is a schematic view showing a display substrate according to an embodiment of the present disclosure.

In a specific embodiment, as shown in FIG. 2, the metal pattern in this embodiment is a gate metal layer pattern 19 arranged on the light emitting side of the display substrate. The display substrate further includes a gate insulating layer 14, an active layer 15, and a source-drain metal layer pattern 16, a passivation layer 17 and a pixel electrode 18. In this embodiment, in order to reduce the reflection of the ambient light by the gate metal layer pattern 19, an anti-reflection pattern 12 is provided between the gate metal layer pattern 19 and the base substrate 11.

In this embodiment, the reflectivity of the display substrate to ambient light can be adjusted by adjusting the thicknesses of the anti-reflection pattern 12 and the gate metal layer pattern 19. In a specific example, the anti-reflection pattern 12 is made of molybdenum oxide doped with tantalum, and the gate metal layer pattern 19 is made of copper. As shown in Table 1, when the thickness of the anti-reflection pattern 12 is 30 nm, and the thickness of the gate metal layer pattern 19 is 350 nm, the substrate including only the anti-reflection pattern 12 and the gate metal layer pattern 19 has a reflectivity to ambient light of 23.10%, and the overall display color is purplish red. When the thickness of the anti-reflection pattern 12 is 40 nm, and the thickness of the gate metal layer pattern 19 is 350 nm, the substrate including only the anti-reflection pattern 12 and the gate metal layer pattern 19 has a reflectivity to ambient light of 10.87%, and the overall display color is red. When the thickness of the anti-reflection pattern 12 is 45 nm, and the thickness of the gate metal layer pattern 19 is 350 nm, the substrate including only the anti-reflection pattern 12 and the gate metal layer pattern 19 has a reflectivity to ambient light of 8.08%, and the overall display color is purple. When the thickness of the anti-reflection pattern 12 is 50 nm, and the thickness of the gate metal layer pattern 19 is 350 nm, the substrate including only the anti-reflection pattern 12 and the gate metal layer pattern 19 has a reflectivity to ambient light of 7.33%, and the overall display color is black. When the thickness of the anti-reflection pattern 12 is 55 nm, and the thickness of the gate metal layer pattern 19 is 350 nm, the substrate including only the anti-reflection pattern 12 and the gate metal layer pattern 19 has a reflectivity to ambient light of 7.37%, and the overall display color is black. When the thickness of the anti-reflection pattern 12 is 60 nm, and the thickness of the gate metal layer pattern 19 is 350 nm, the substrate including only the anti-reflection pattern 12 and the gate metal layer pattern 19 has a reflectivity to ambient light of 7.63%, and the overall display color is blackish cyan. When the thickness of the anti-reflection pattern 12 is 65 nm, and the thickness of the gate metal layer pattern 19 is 350 nm, the substrate including only the anti-reflection pattern 12 and the gate metal layer pattern 19 has a reflectivity to ambient light of 9.27%, and the overall display color is blackish cyan. When the thickness of the anti-reflection pattern 12 is 70 nm, and the thickness of the gate metal layer pattern 19 is 350 nm, the substrate including only the anti-reflection pattern 12 and the gate metal layer pattern 19 has a reflectivity to ambient light of 10.60%, and the overall display color is blackish cyan. When the thickness of the anti-reflection pattern 12 is 75 nm, and the thickness of the gate metal layer pattern 19 is 350 nm, the substrate including only the anti-reflection pattern 12 and the gate metal layer pattern 19 has a reflectivity to ambient light of 12.89%, and the overall display color is blackish cyan.

TABLE 1

| anti-reflection pattern thickness (nm) | gate metal layer thickness (nm) | reflectivity | substrate color |
|---|---|---|---|
| 30 | 350 | 23.10% | purplish red |
| 40 | 350 | 10.87% | red |
| 45 | 350 | 8.08% | purple |
| 50 | 350 | 7.33% | black |
| 55 | 350 | 7.37% | black |
| 60 | 350 | 7.63% | blackish cyan |
| 65 | 350 | 9.27% | blackish cyan |
| 70 | 350 | 10.60% | blackish cyan |
| 75 | 350 | 12.89% | blackish cyan |

As can be seen, when the thickness of the anti-reflective pattern 12 is in a range from 50 nm to 55 nm, the substrate including only the anti-reflective pattern 12 and the gate metal layer pattern 19 has a relatively small reflectivity to ambient light.

In this embodiment, the display color under the shutdown screen of the display substrate can be adjusted by adjusting the thickness of the anti-reflection pattern 12, the gate metal layer pattern 19, and the source-drain metal layer pattern 16.

In a specific example, the anti-reflection pattern 12 is made of molybdenum oxide doped with tantalum, the gate metal layer pattern 19 is made of copper, and the source-drain metal layer pattern 16 is made of a stacked structure of molybdenum/aluminum/molybdenum. When the thickness of the anti-reflection pattern 12 is 54 nm, the thickness of the gate metal layer pattern 19 is 350 nm, and the thickness of the three layers of the source-drain metal layer pattern 16 are 15 nm, 300 nm, and 80 nm, respectively, and the display color under the shutdown screen of the display substrate is black with green.

In another specific example, the anti-reflection pattern 12 is made of molybdenum oxide doped with tantalum, the gate metal layer pattern 19 is made of copper, and the source-drain metal layer pattern 16 is made of copper. When the thickness of the anti-reflection pattern 12 is 54 nm, the thickness of the gate metal layer pattern 19 is 350 nm and the thickness of the source-drain metal layer pattern 16 is 350 nm, the display color under the shutdown screen of the display substrate is reddish black.

In another specific example, the anti-reflection pattern 12 is made of molybdenum oxide doped with tantalum, the gate metal layer pattern 19 is made of copper, and the source-drain metal layer pattern 16 is made of copper. In addition, an anti-reflection pattern is also arranged on a surface of the source-drain metal layer pattern 16 facing the base substrate 11, the thickness of the anti-reflection pattern 12 is 54 nm, the thickness of the gate metal layer pattern 19 is 350 nm, and the thickness of the source-drain metal layer pattern 16 is 350 nm, the display color under the shutdown screen of the display substrate is pure black.

An embodiment of the present disclosure further provides a display device, including the display substrate as described above and a color filter substrate arranged oppositely to form a cell with the display substrate, the display substrate is located on a light exiting side of the color filter substrate. The display device may be a liquid crystal display device or an organic light emitting diode display device. The display device may be any product or component having a display function, such as a television, a display, a digital photo frame, a mobile phone, a tablet computer, etc., in which the display device further includes a flexible circuit board, a printed circuit board, and a backplane.

An embodiment of the present disclosure further provides a method for preparing a display substrate, including: providing a base substrate; forming an anti-reflection layer on the base substrate using molybdenum oxide doped with a refractory metal, the melting point of the refractory metal being greater than the temperature threshold; forming a metal layer on the anti-reflection layer; coating photoresist on the metal layer, and exposing and developing of the photoresist to form a photoresist pattern; and etching the anti-reflection layer and the metal layer with an etching solution by using the photoresist pattern as a mask plate, to form the anti-reflection pattern and the metal pattern, respectively.

In order to reduce the reflection of the display substrate to ambient light, in this embodiment, the anti-reflection pattern is formed on the base substrate using molybdenum oxide doped with a refractory metal, and then a metal pattern is formed on the anti-reflection pattern. As shown in FIG. 1, in this way, after the ambient light is incident to the surfaces of the metal pattern 13 and the anti-reflection pattern 12, the second light 5 and the first light 4 reflected by the two surfaces has the same phase, the light waves encounter in the space to allow a destructive interference, thereby greatly reducing the reflectivity to ambient light of metal pattern 13.

In addition, as compared with the direct formation of the metal pattern 13 on the base substrate 11, the attachment of the metal pattern 13 to the base substrate 11 by molybdenum oxide can not only enhance the adhesion of the metal pattern 13 to the base substrate, but also prevent the metal ions in the metal pattern 13 from diffusing into the base substrate 11, thereby further improving the performance of the display substrate.

In this embodiment, the anti-reflection pattern 12 is made of molybdenum oxide doped with a refractory metal, in which the refractory metal is a metal having a melting point greater than a temperature threshold, specifically, the temperature threshold may be 2000° C. The refractory metal includes, but is not limited to, metals, such as tantalum Ta, niobium Nb, titanium Ti, and tungsten W.

Doping refractory metals in molybdenum oxide can further reduce the reflection of the metal pattern to ambient light. By doping different refractory metals in molybdenum oxide, different overall display colors can be achieved in the shutdown screen to meet the user's diverse needs.

Specifically, molybdenum oxide includes molybdenum dioxide and/or molybdenum trioxide. Molybdenum dioxide or molybdenum trioxide has high electrical conductivity. The anti-reflection pattern made of molybdenum dioxide or molybdenum trioxide has conductivity, is in parallel with the metal pattern, and can also reduce the resistance of the metal pattern, thereby further improving the performance of the display substrate.

In a specific embodiment, the forming the anti-reflection pattern and the metal pattern includes the following step 1 and step 2.

Step 1: bombarding a target made of molybdenum oxide doped with a refractory metal by using a first plasma, to form the anti-reflection layer on the base substrate.

Specifically, the molybdenum oxide powder and the refractory metal powder can be uniformly mixed and then sintered to make a molybdenum oxide target doped with a refractory metal. In the molybdenum oxide target doped with the refractory metal, the molar ratio of the refractory metal to the molybdenum can be in a range from 2:100 to 10:100. By adjusting the molar ratio of refractory metal to molybdenum, the reflectivity of the display substrate to ambient light can be adjusted; and the display substrate can also display different colors in the shutdown screen.

A physical vapor deposition (PVD) device can be used to deposit the anti-reflection layer. Specifically, in a vacuum environment, under the combined action of voltage and magnetic field, the molybdenum oxide target is bombarded with ionized inert gas ions such as Ar particles, so that the molybdenum oxide target is ejected in the form of ions, atoms or molecules and deposited on the base substrate to form a molybdenum oxide thin film. The gas flow rate of the sputtering gas can be in a range from 600 sccm to 800 sccm, the deposition gas pressure can be in a range from 0.25 Pa to 0.35 Pa, the sputtering power can be in a range from 7.5 kw to 8.5 kw, the film formation rate can be in a range from 13 Å/s to 14 Å/s, thereby ensuring the uniformity of the deposited film layer.

Step 2: bombarding a target made of metal by using a second plasma, to form the metal layer on the base substrate.

Specifically, a layer of copper can be deposited as a metal layer using PVD equipment.

Step 3: coating photoresist on the metal layer, and exposing and developing of the photoresist to form a photoresist pattern.

Step 4: etching the anti-reflection layer and the metal layer with an etching solution by using the photoresist pattern as a mask plate, to form the anti-reflection pattern and the metal pattern, respectively.

Specifically, the anti-reflective layer and the metal layer may be etched by using an acid etching solution. In a specific example, the etching solution may be a mixed solution of $H_2SO_4$ and $H_2O_2$.

Since copper has good conductivity, the metal pattern 13 can be made of copper. Of course, the material of the metal pattern 13 is not limited to copper, and other metals or alloys having good conductivity can also be used. For example, the metal pattern 13 can also be made of an alloy of MoNb and Cu, or an alloy of Al, Mo and Al. The metal pattern 13 may also be made from a stacked structure of Mo/Al/Mo.

Unless otherwise defined, technical terms or scientific terms used herein have the normal meaning commonly understood by one skilled in the art in the field of the present disclosure. The words "first", "second", and the like used herein does not denote any order, quantity, or importance, but rather merely serves to distinguish different components. The "including", "comprising", and the like used in the present disclosure means that the element or item appeared in front of the word encompasses the element or item and their equivalents listed after the word, and does exclude other elements or items. The word "connected" or "connecting" and the like are not limited to physical or mechanical connections, but may include electrical connections, whether direct or indirect. "On", "under", "left", "right" and the like are only used to represent relative positional relationships, and when the absolute position of the described object is changed, the relative positional relationship may also be changed, accordingly.

It will be understood that when an element, such as a layer, film, region, or substrate, is referred to as being "on" or "under" another element, the element may be directly "on" or "under" another element, or there may be an intermediate element.

The above descriptions are optional embodiments of the present disclosure. It should be noted that one skilled in the art would make several improvements and substitutions without departing from the principles of the present disclosure. These improvements and modifications should also be regarded as the protection scope of the present disclosure.

The invention claimed is:

1. A display substrate, comprising:
   a base substrate;
   a metal pattern located on the base substrate, and
   an anti-reflection pattern located on a surface of the metal pattern proximate to the base substrate;
   wherein a material of the anti-reflection pattern comprises molybdenum oxide doped with a refractory metal, and a melting point of the refractory metal is greater than a temperature threshold,
   wherein the display substrate is an array substrate, and the metal pattern is a gate metal layer pattern,
   wherein a material of the metal pattern is copper, the array substrate further comprises a source-drain metal layer pattern, and a material of the source-drain metal layer pattern is a stacked structure of molybdenum/aluminum/molybdenum structure,
   wherein the refractory metal comprises tantalum, the thickness of the anti-reflection pattern is 54 nm, a thickness of the gate metal pattern is 350 nm, the source-drain metal layer pattern is a stacked structure of molybdenum/aluminum/molybdenum, and thicknesses of molybdenum, aluminum and molybdenum layers are 15 nm, 300 nm, and 80 nm, respectively, and
   wherein in the anti-reflection pattern, a molar ratio of the refractory metal to molybdenum is in a range of 2:100 to 10:100.

2. The display substrate of claim 1, wherein the temperature threshold is 2000° C.

3. The display substrate of claim 1, wherein the molybdenum oxide comprises molybdenum dioxide and/or molybdenum trioxide, and the refractory metal comprises at least one of tantalum, niobium, titanium, and tungsten.

4. The display substrate of claim 1, wherein a reflectivity of the display substrate is less than 10%.

5. A display device, comprising the display substrate according to claim 1, a color film substrate arranged oppositely to form a cell with the display substrate and a backlight source, wherein the display substrate is located on a surface of the color filter substrate away from the backlight source.

6. The display device of claim 5, wherein the temperature threshold is 2000° C.

7. The display device of claim 5, wherein the molybdenum oxide comprises molybdenum dioxide and/or molybdenum trioxide, and the refractory metal comprises at least one of tantalum, niobium, titanium, and tungsten.

8. The display device of claim 5, wherein a reflectivity of the display substrate is less than 10%.

9. A method for preparing a display substrate of claim 1, comprising:
   providing a base substrate;
   forming an anti-reflection layer on the base substrate using molybdenum oxide doped with a refractory metal, wherein a melting point of the refractory metal is greater than a temperature threshold;
   forming a metal layer on the anti-reflection layer;
   coating photoresist on the metal layer, and exposing and developing of the photoresist to form a photoresist pattern; and
   etching the anti-reflection layer and the metal layer with an etching solution using the photoresist pattern as a mask plate, to form the anti-reflection pattern and the metal pattern.

10. The method of claim 9, wherein the forming the anti-reflection pattern and the metal pattern comprising:
    bombarding a target made of molybdenum oxide doped with a refractory metal using a first plasma, to form the anti-reflection layer on the base substrate;
    bombarding a target made of metal using a second plasma, to form the metal layer on the base substrate;
    coating photoresist on the metal layer, and exposing and developing of the photoresist to form a photoresist pattern; and
    etching the anti-reflection layer and the metal layer with an etching solution using the photoresist pattern as a mask plate, to form the anti-reflection pattern and the metal pattern.

11. The method of claim 9, wherein the temperature threshold is 2000° C.

12. The method of claim 9, wherein the molybdenum oxide comprises molybdenum dioxide and/or molybdenum trioxide, and the refractory metal comprises at least one of tantalum, niobium, titanium, and tungsten.

13. The method of claim 9, wherein a reflectivity of the display substrate is less than 10%.

* * * * *